United States Patent [19]
Roukis et al.

[11] 3,913,664
[45] Oct. 21, 1975

[54] SELF-FILLING ARTERIAL HEAT PIPE

[75] Inventors: John G. Roukis, Syosset; Robert L. Kosson, Massapequa; John R. Westell, Huntington Station, all of N.Y.

[73] Assignee: Grumman Aerospace Corporation, Bethpage, N.Y.

[22] Filed: Jan. 12, 1973

[21] Appl. No.: 322,964

[52] U.S. Cl. ............... 165/105; 29/157.3 R; 138/40
[51] Int. Cl. .............................................. F28d 15/00
[58] Field of Search .......... 165/105; 261/92, 94, 99; 62/511, 494; 138/40, 44

[56] References Cited
UNITED STATES PATENTS

| | | | |
|---|---|---|---|
| 2,517,654 | 8/1950 | Gaugler | 261/99 |
| 2,615,699 | 10/1952 | Dixon | 261/94 X |
| 2,876,800 | 3/1959 | Kalff | 138/40 |
| 2,921,776 | 1/1960 | Keeping | 261/94 |
| 3,283,787 | 11/1966 | Davis | 138/40 X |
| 3,620,298 | 11/1971 | Somerville | 165/105 |
| 3,720,988 | 3/1973 | Waters | 165/105 X |
| 3,734,173 | 5/1973 | Moritz | 165/105 |

Primary Examiner—Albert W. Davis, Jr.
Attorney, Agent, or Firm—Morgan, Finnegan, Pine, Foley & Lee

[57] ABSTRACT

An arterial heat pipe has been devised which is self-filling and has high capacity. The artery comprises a plurality of screen layers which are separated by spacing means.

25 Claims, 12 Drawing Figures

SELF-FILLING ARTERIAL HEAT PIPE

BACKGROUND OF THE INVENTION

Heat pipes have been known which were provided with arteries which could be filled only by immersing the artery completely in the vaporizable liquid which was used in the heat pipe. After these arteries were filled they were easily drained of liquid which would collect at the lower part of the heat pipe. This draining phenomenon appears to be caused by a pressure differential between vapor and liquid at a given point on the artery surface where said pressure differential exceeds the value which can be sustained by surface tension. If the heat pipe is tilted or transient pressure variations are induced by vibration, the liquid pressure will drop. This may also occur due to manufacturing defects in the artery surface.

It is therefore, a primary object of the present invention to provide a new and novel heat pipe which is self-filling even without immersion in liquid by internally developed surface tension forces. These heat pipes may be used as variable conductance heat pipes or as unidirectional heat pipes. The structure of this heat pipe includes an outer casing and a supported axially disposed artery which is formed from a plurality of screen layers.

DETAILED DESCRIPTION OF THE INVENTION

Figure 1:
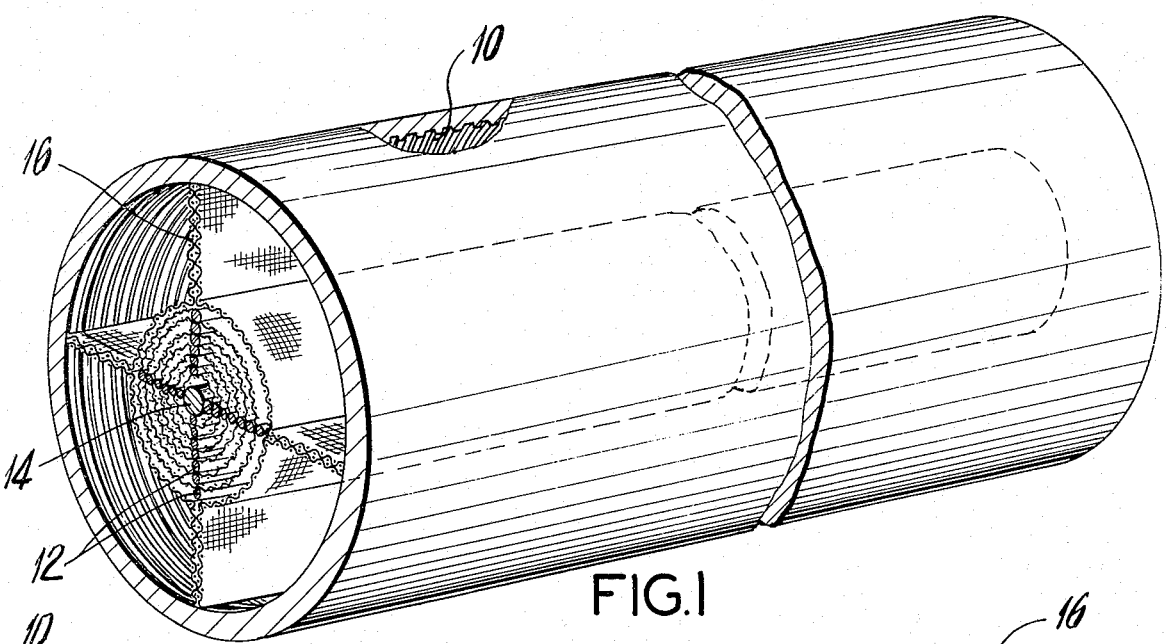
FIG. 1 is a perspective view of a section of a heat pipe of this invention which shows in partial cutaway, the wall capillary which is a grooved surface on the internal wall of the casing.
Figure 3:
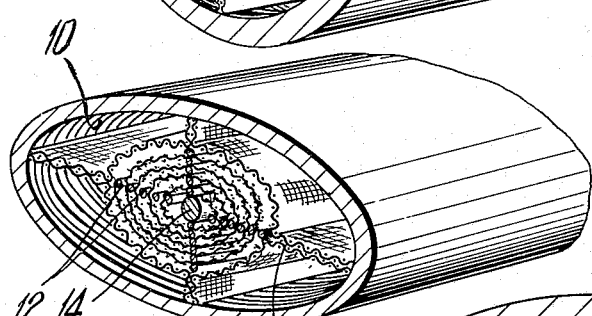
FIG. 3 is a perspective view of a heat pipe of the invention which is ovoid in cross-section.
Figure 4:
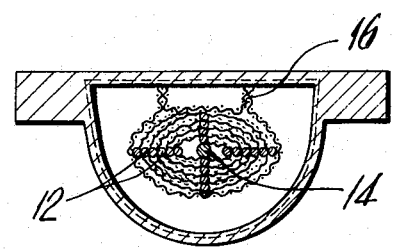
FIG. 4 is a cross-section of a heat pipe of the invention which has one flat surface.
Figure 2:
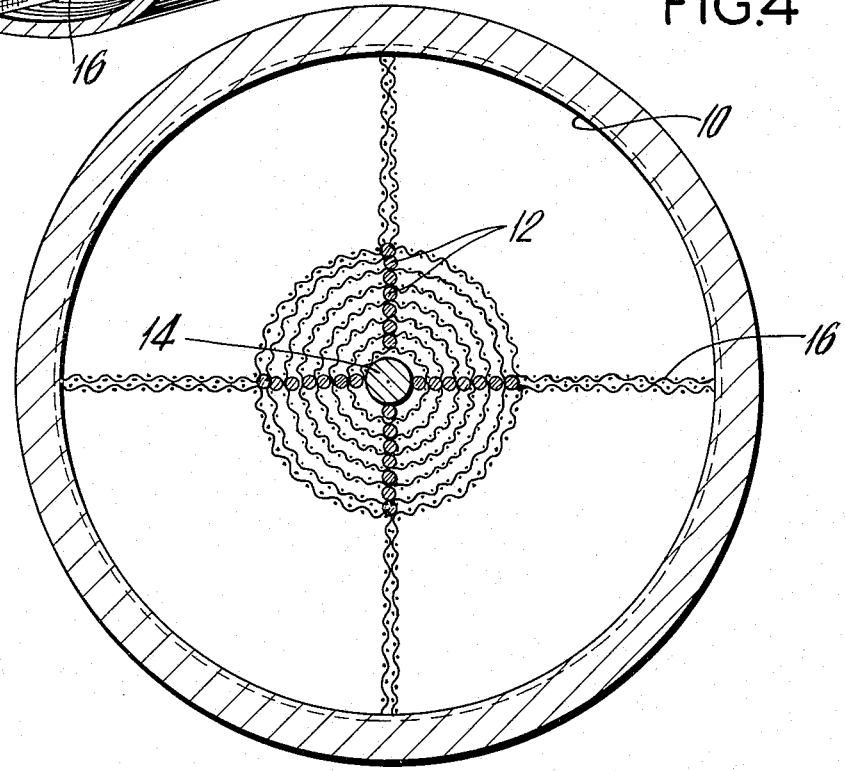
FIG. 2 is a cross-sectional view of a heat pipe according to the present invention.
Figure 5:
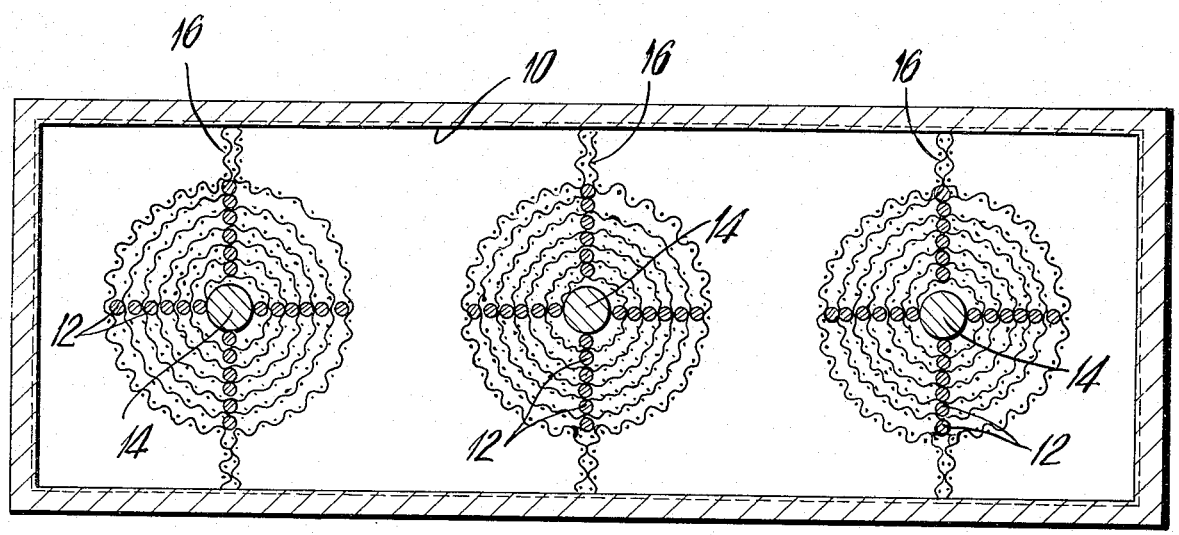
FIG. 5 is a cross-section of a heat pipe of the invention which has flat sides and more than one artery.

The heat pipe of the invention comprises a closed outer casing having a wall capillary and a vaporizable liquid carried therein and having an axially diposed artery formed by a plurality of screen layers separated by spacing means to provide a spacing of said screen layers which will permit capillary filling of said artery and longitudinal flow of vaporizable liquid.

The artery may be formed by winding a screen in a spiral to build up a multi-layered structure. As the spiral is formed around a central core, spacers are placed at predetermined intervals to form an artery structure which will fill by capillary action. Those skilled in the art will appreciate that capillarity is a result of the attractive force between two unlike molecules which is shown by the wetting of a solid surface by a liquid and is dependent upon the nature of the liquid and the solid as well as the particular configuration of the solid material.

Therefore, the selection of the dimensions of the spacer means must be matched to the particular vaporizable liquid in order to make a self-filling artery. The spacer means may be round, square, oval or rectangular elongated rods. It is also contemplated that elevated points at spaced intervals on the surface of the screen may be used as spacing means. These elevated points may be in the form of dimples that are formed by deformation of the screen material itself or are applied by bolting, welding, soldering or adhesively bonding an appropriate metal, plastic or other suitable type of material to the surface of the screen. An alternate spacing means may comprise strips of screening that are fastened to the screen layers or held by friction within the layered structure.

A typical artery according to this invention will have spacers which separate the screen layers by a distance in the range of about 0.005 to about 0.020 inch. When liquid ammonia is used as the vaporizable liquid, circular rods having a diameter of from about 0.009 to about 0.020 inch, preferably about 0.016 inch have been found to be operable. Rods or spacing means may be provided in graded sizes with slightly larger spaces being provided toward the outer area of the artery.

Other usable liquids include water, acetone, methyl alcohol, and low molecular weight halogenated hydrocarbons such as dichloromonofluoromethane, dichlorodifluoromethane, monochlorodifluoromethane, carbontetrafluoride and the like. The heat pipe of this invention is usable from low to moderately high temperatures, as for example from cryogenic levels to about 300°F. The screen layers may be made of stainless steel, aluminum, fiberglass or any metal alloy or stable material which is compatible with the selected vaporizable liquid.

The screen layers may also be made of spaced annular rings of different sizes. The screen itself may be of a woven, knitted or perforated type of construction. Mesh sizes (U.S. standard mesh) in the order of about 50 to about 350 mesh, preferably about 100 mesh, may be used depending on the particular vaporizable liquid.

It is contemplated that the axially disposed artery will be supported in the heat pipe by a plurality of radially disposed legs or webs which will space the artery at approximately equal distances from the internal surface of the heat pipe. These legs may be made of screening and will preferably extend along the entire length of the artery. Usually two or more legs (i.e. up to about 16) may be employed for this purpose.

The heat pipe may have a casing which is substantially linear or one which extends through an arcuate path to form a generally curved type of structure. These curved type structures may be either generally toroidal, semi-circular or U-shaped. Either of these types of heat pipes may be circular, square, rectangular, or ovoid in cross-section.

Other embodiments of the heat pipe may be shaped with cross-sections having one or more flat sides or a plurality of arteries may be arranged side-by-side with appropriate dividing walls to form a multiple heat pipe type of assembly. Such heat pipes may be used for special purposes, for instance, as the means for cooling a large surface area which is exposed to high temperatures.

The wall capillary may be a brazed screen or liner which is affixed to the internal wall or it may be a spiral groove which is cut or etched into the wall of the heat pipe. The grooves may also be a series of unconnected grooves which extend around the internal wall of the heat pipe.

The width of these grooves should be small enough to fill under surface tension forces. This is to insure that longitudinal flow will be maintained along the internal walls of the heat pipe and localized "hot spots" due to drying out of the wall will be avoided.

The grooves may be spaced so that there are about 60 to about 300 per inch, preferably about 100 per inch and are cut about 0.0010 –0.0075 inch wide, preferably about 0.0050 inch wide and about 0.010 inch in depth. It is preferred to cut these grooves so that they are trapezoidal in cross-section.

The grooves should be sized so that their geometrical capillary characteristics match those of the leg or web screening components used to fabricate the supporting parts of the artery and to insure that said parts communicate with substantially all of the wall capillary. Aluminum screen of 120 U.S. standard mesh has been found useful for a screen wall capillary when brazed to the internal wall of the heat pipe.

DESCRIPTION OF THE PREFERRED EMBODIMENT

A heat pipe casing is formed from a ½ inch O.D., about 0.030 inch thick aluminum 6061-T6 tube by internally threading said tube with a 0.007 inch deep thread profile at a pitch of 104 threads to form grooves 10. The artery has a spiral configuration and is constructed by spot welding 17 0.015 inch gap spacer wires 12 and a 0.062 inch spine rod 14 (in the center of the artery) to a flat 36 inch piece of 100 mesh stainless steel screening.

After the gap spacer wires are spaced on the wire mesh, the artery is formed by spirally wrapping the screen mesh-gap spacer wire assembly around the spine rod 14. An annular wire mesh screen sock or sleeve may be placed around the artery to preserve geometrical continuity. The sock, if used, may be made by soft soldering or welding a seam on an annularly formed screen which, is sized to cover the outside of the artery. After the sock is positioned over the artery by means of an appropriate expander, both ends of the artery are sealed in 100 mesh screen caps (not shown). The artery legs 16 or webs which also act as supports, are formed by spot welding four sections of wire screening so that a circular tube retainer assembly is formed, with four double screen sections extending outwardly at 90° intervals on the surface of said circular tube. The double-screen outwardly extending projections are trimmed so that they are long enough to touch the internal walls of the heat pipe but not long enough to prevent proper installation in the heat pipe by functional engagement with the threaded internal wall.

Thereafter, the artery is placed in the circular tube retainer assembly and this is then fitted into the heat pipe casing. The pipe is then capped, with one cap having a small, diameter fill tube attached. The pipe is charged with ammonia through the fill tube, which is then sealed by welding.

In another embodiment, an aluminum screen of 120 mesh was used as the wall capillary and the support member was made with eight legs.

Although the invention has been particularly shown and described with reference to preferred embodiments thereof, it will be understood by those skilled in the art that changes may be made in the form and details therein without departing from the spirit and scope of the invention.

What is claimed is:

1. A heat pipe having a closed casing, a wall capillary and vaporizable liquid carried thereby and including at least one supported axially disposed artery formed by a plurality of screen layers that are separated by spacing means to provide a spacing of said screen layers which will permit capillary filling of said artery and longitudinal flow of vaporizable liquid, said supported axially disposed artery having a plurality of screen mesh legs that act as support means.

2. The heat pipe of claim 1 wherein the plurality of screen layers are formed by a spirally wound screen.

3. The heat pipe of claim 1 wherein the plurality of screen layers are concentrically disposed annular rings.

4. The heat pipe of claim 1 wherein the spacing means comprise a plurality of elongated rods.

5. The heat pipe of claim 4 wherein the elongated rods have the same cross-sectional area.

6. The heat pipe of claim 4 wherein the elongated rods have different cross-sectional area.

7. The heat pipe of claim 1 wherein the axially disposed artery is supported in the heat pipe by a plurality of screen mesh legs.

8. The heat pipe of claim 1 wherein the wall capillary system has a configuration which matches the screening components of the supported axially disposed artery.

9. The heat pipe of claim 1 wherein the casing of said heat pipe has a substantially linear configuration.

10. The heat pipe of claim 9 wherein said heat pipe is substantially circular, square, rectangular, or ovoid in cross-section.

11. The heat pipe of claim 9 wherein said heat pipe has a cross-section with at least one flat side.

12. The heat pipe of claim 1 wherein said screen layers are formed of woven metal wire mesh.

13. The heat pipe of claim 1 wherein the screen layers are formed of from about 50 to about 350 mesh stainless steel woven wire screening.

14. The heat pipe of claim 1 wherein the plurality of screen layers are formed of a knitted wire structure.

15. The heat pipe of claim 1 wherein the wall capillary is a spiral groove which is cut into the wall of the closed casing.

16. The heat pipe of claim 1 wherein the wall capillary is a series of unconnected, grooves which extend around the internal wall of the heat pipe.

17. The heat pipe of claim 1 wherein the axially disposed artery is supported by at least two legs that are constructed of screen mesh.

18. The heat pipe of claim 1 wherein said heat pipe has a casing which extends through an arcuate path.

19. The heat pipe of claim 18 wherein said heat pipe is substantially circular, square, rectangular or ovoid in cross-section.

20. The heat pipe of claim 18 wherein said heat pipe has a cross-section with at least one flat side.

21. The heat pipe of claim 1 wherein said screen layers are formed of a perforated metal sheet.

22. The heat pipe of claim 1 wherein the spacing means comprise a plurality of elevated points on the surface of said screen layers.

23. The heat pipe of claim 1 wherein said spacing means comprise a plurality of screening strips which are spaced between the screen layers.

24. A heat pipe which comprises a tubular closed casing that has a wall capillary and a vaporizable liquid carried therein by an axially disposed artery formed by a plurality of screen layers separated by spacing means to effect predetermined spacing of said screen layers to permit capillary filling of said artery and longitudinal flow of vaporizable liquid, said axially disposed artery having a plurality of screen mesh legs that act as support means.

25. A method of making a heat pipe which comprises forming an internally grooved tubular casing; placing therein an axially disposed artery formed by a plurality of screen layers that are separated by spacing means which permit capillary filling of said artery and longitudinal flow of vaporizable liquid, said axially disposed artery having a plurality of supports which engage the walls of the heat pipe to support said artery; filling said heat pipe with a sufficient amount of a vaporizable liquid and applying suitable means to seal said heat pipe.

* * * * *

UNITED STATES PATENT OFFICE
CERTIFICATE OF CORRECTION

Figure 6:
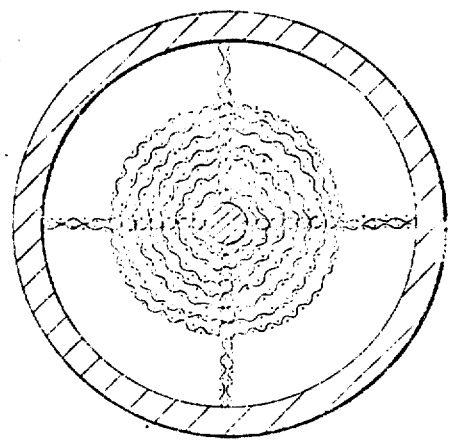
FIG. 6 is a cross-section of a heat pipe wherein the elongated rods have different cross-sectional area.
Figure 7:
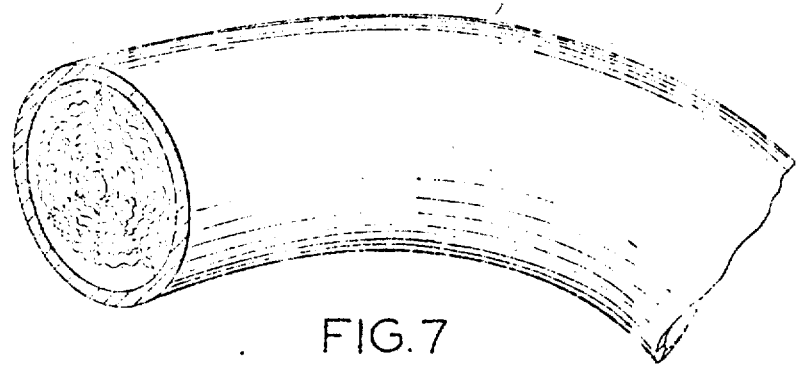
FIG. 7 is an elevation of a heat pipe casing that extends through an arcuate path.
Figure 8:
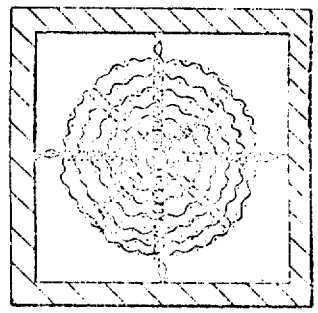
FIG. 8 is a cross-section of a heat pipe having a square cross-section.
Figure 9:
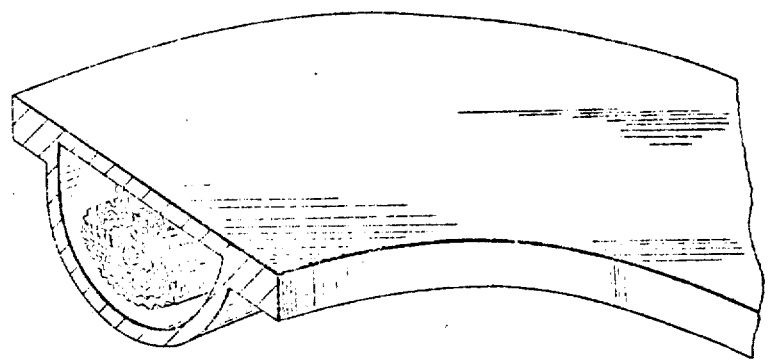
FIG. 9 is an elevation of a heat pipe casing that extends through an arcuate path and has one flat side.
Figure 10:
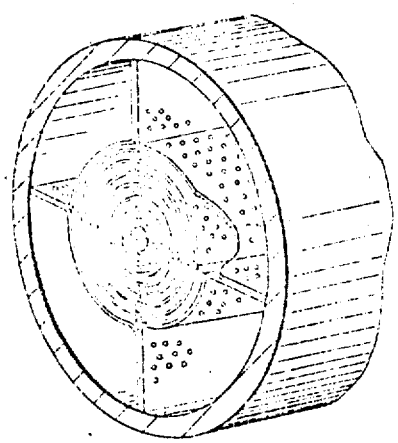
FIG. 10 is a partial cutaway of a heat pipe wherein the screen layers are formed of a perforated metal sheet.
Figure 11:
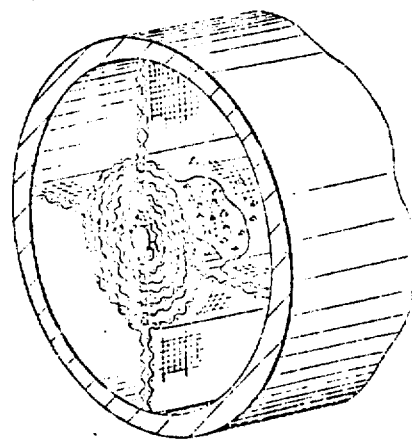
FIG. 11 is a partial cutaway of a heat pipe wherein the spacing means comprise a plurality of elevated points on the surface of said screen layers.
Figure 12:
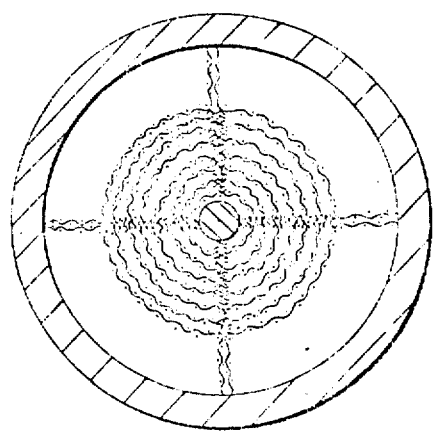
FIG. 12 is a cross-section of a heat pipe wherein said spacing means comprise a plurality of screening strips which are spaced between the screen layers.

PATENT NO. : 3,913,664
DATED : October 21, 1975
INVENTOR(S) : John G. Roukis, et al It is certified that error appears in the above-identified patent and that said Letters Patent are hereby corrected as shown below:

In the drawing: Figures 6-12 have been added.

Signed and Sealed this twenty-seventh Day of April 1976

[SEAL]

Attest:

RUTH C. MASON
Attesting Officer

C. MARSHALL DANN
Commissioner of Patents and Trademarks